United States Patent
Goldman et al.

(10) Patent No.: US 8,379,825 B2
(45) Date of Patent: Feb. 19, 2013

(54) SYSTEM AND METHOD FOR ESTABLISHING PSTN CALLS VIA AN IP REQUEST

(75) Inventors: Stuart Owen Goldman, Scottsdale, AZ (US); Kevin M. Patfield, Phoenix, AZ (US)

(73) Assignee: Alcatel Lucent, Paris (FR)

( * ) Notice: Subject to any disclaimer, the term of this patent is extended or adjusted under 35 U.S.C. 154(b) by 1247 days.

(21) Appl. No.: 10/867,086

(22) Filed: Jun. 14, 2004

(65) Prior Publication Data

US 2005/0276409 A1 Dec. 15, 2005

(51) Int. Cl.
*H04M 3/42* (2006.01)

(52) U.S. Cl. .............. 379/210.01; 370/351; 370/352

(58) Field of Classification Search .......... 370/351–352; 379/112, 45, 46, 112.01, 201.01, 210.01; 455/422, 422.1
See application file for complete search history.

(56) References Cited

U.S. PATENT DOCUMENTS

| | | | | |
|---|---|---|---|---|
| 5,311,583 A | * | 5/1994 | Friedes et al. | 379/210.01 |
| 5,500,889 A | * | 3/1996 | Baker et al. | 379/112.04 |
| 5,661,790 A | * | 8/1997 | Hsu | 379/209.01 |
| 5,751,706 A | * | 5/1998 | Land et al. | 370/352 |
| 5,991,394 A | * | 11/1999 | Dezonno et al. | 379/265.09 |
| 6,374,102 B1 | * | 4/2002 | Brachman et al. | 455/422.1 |
| 6,418,210 B1 | * | 7/2002 | Sayko | 379/142.15 |
| 6,522,876 B1 | * | 2/2003 | Weiland et al. | 455/414.1 |
| 6,549,768 B1 | * | 4/2003 | Fraccaroli | 455/456.3 |
| 6,735,292 B1 | * | 5/2004 | Johnson | 379/201.01 |
| 6,954,455 B1 | * | 10/2005 | Al Hakim et al. | 370/352 |
| 2002/0075847 A1 | * | 6/2002 | Gunn et al. | 370/352 |
| 2003/0012183 A1 | * | 1/2003 | Butler et al. | 370/352 |
| 2003/0194060 A1 | * | 10/2003 | Stumer et al. | 379/45 |
| 2003/0235182 A1 | * | 12/2003 | McMullin | 370/352 |
| 2004/0203565 A1 | * | 10/2004 | Chin et al. | 455/404.1 |

FOREIGN PATENT DOCUMENTS

EP 1083730 A2 * 3/2001

OTHER PUBLICATIONS

Internet Engineering Task Force (IETF)—RFC 1613, X.25 over TCP (XOT), May 1994.*

* cited by examiner

*Primary Examiner* — Ahmad Matar
*Assistant Examiner* — Khai N Nguyen
(74) *Attorney, Agent, or Firm* — Fay Sharpe LLP

(57) ABSTRACT

A method of establishing a call over a Public Switched Telephone Network (PSTN) is provided. The PSTN operatively connected to an End Office (EO) serving a calling party's Consumer Premises Equipment (CPE). The method includes: receiving at a network element of the PSTN a message requesting establishment of the call over the PSTN, the message being received over a packet-switched network and identifying the calling party's CPE from which the call is to be placed; and, notifying the EO serving the calling party's CPE of the request for establishment of the call such that the EO treats the call as a terminating call as opposed to an originating call.

23 Claims, 3 Drawing Sheets

SYSTEM AND METHOD FOR ESTABLISHING PSTN CALLS VIA AN IP REQUEST

FIELD

The present inventive subject matter relates to the telecommunication arts. Particular application is found in conjunction with the Government Emergency Telecommunication Service (GETS), and the specification makes particular reference thereto. However, it is to be appreciated that aspects of the present inventive subject matter are also amenable to other applications.

BACKGROUND

The Public Switched Telephone Network (PSTN) includes mechanisms to give higher than normal priority to certain calls in certain circumstances. For example, the GETS allows authorized users to identify themselves to the PSTN, and be given high-priority access to trunk and switch resources. Typically, to utilize the GETS, a user places an initiating call by dialing a secret telephone number, and then enters a secret identification number, followed by the telephone number of the party being called.

While generally acceptable for its intended purpose, the foregoing approach has certain drawbacks. For example, during an emergency, trunk and/or switch resources may be scarce and call attempts may be much higher than normal. Accordingly, placing the initiating call to the secret telephone number may be delayed. That is to say, until dial tone is received by the caller in order to originate a call, there is no way to notify the telecommunication switch that the call being placed is a priority call.

In the context of normal operation, a telecommunication switch (e.g., a class 5 switch such as the Lucent Technologies 5ESS and/or other like telecommunication switches) generally provides dial tone to end user equipment (e.g., telephones) served by the switch on a first come first serve basis. That is to say, the switch scans the lines served to detect when a telephone goes off hook, and provides dial tone to those telephones going off hook in the order in which they are detected, so long as sufficient resources are available. When switch resources are low (e.g., when the switch is overloaded with calls, such as in the case of an emergency situation where many individuals are placing calls simultaneously), dial tone may not be provided to later initiated calls until resources are freed-up or otherwise made available, e.g., by other calls being ended. Accordingly, a GETS call may be unduly delayed insomuch as the priority of the GETS call is not identified until the user can place the initiating call to the secret telephone number, and the initiating call cannot be placed until a dial tone can be obtained.

In addition, users of the telephone network often need to make calls on a scheduled or periodic basis. Currently, such calls have to be established manually when the user is reminded to do so by some other means.

Accordingly, a new and improved system and/or method for establishing PSTN calls via an Internet Protocol (IP) request is disclosed that overcomes the above-referenced problems and others.

SUMMARY

In accordance with one preferred embodiment, a method of establishing a call over a Public Switched Telephone Network (PSTN) is provided. The PSTN operatively connected to an End Office (EO) serving a calling party's Consumer Premises Equipment (CPE). The method includes: receiving at a network element of the PSTN a message requesting establishment of the call over the PSTN, the message being received over a packet-switched network and identifying the calling party's CPE from which the call is to be placed; and, notifying the EO serving the calling party's CPE of the request for establishment of the call such that the EO treats establishment of the call like a terminating call as opposed to an originating call.

In accordance with another preferred embodiment, a system is provided for establishing a call over a Public Switched Telephone Network (PSTN). The PSTN operatively connected to an End Office (EO) serving a calling party's Consumer Premises Equipment (CPE). The system includes: a network element within the PSTN for receiving a message requesting establishment of the call over the PSTN, the message being received over a packet-switched network and identifying the calling party's CPE from which the call is to be placed; and, means for notifying the EO serving the calling party's CPE of the request for establishment of the call such that the EO treats establishment of the call like a terminating call as opposed to an originating call.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
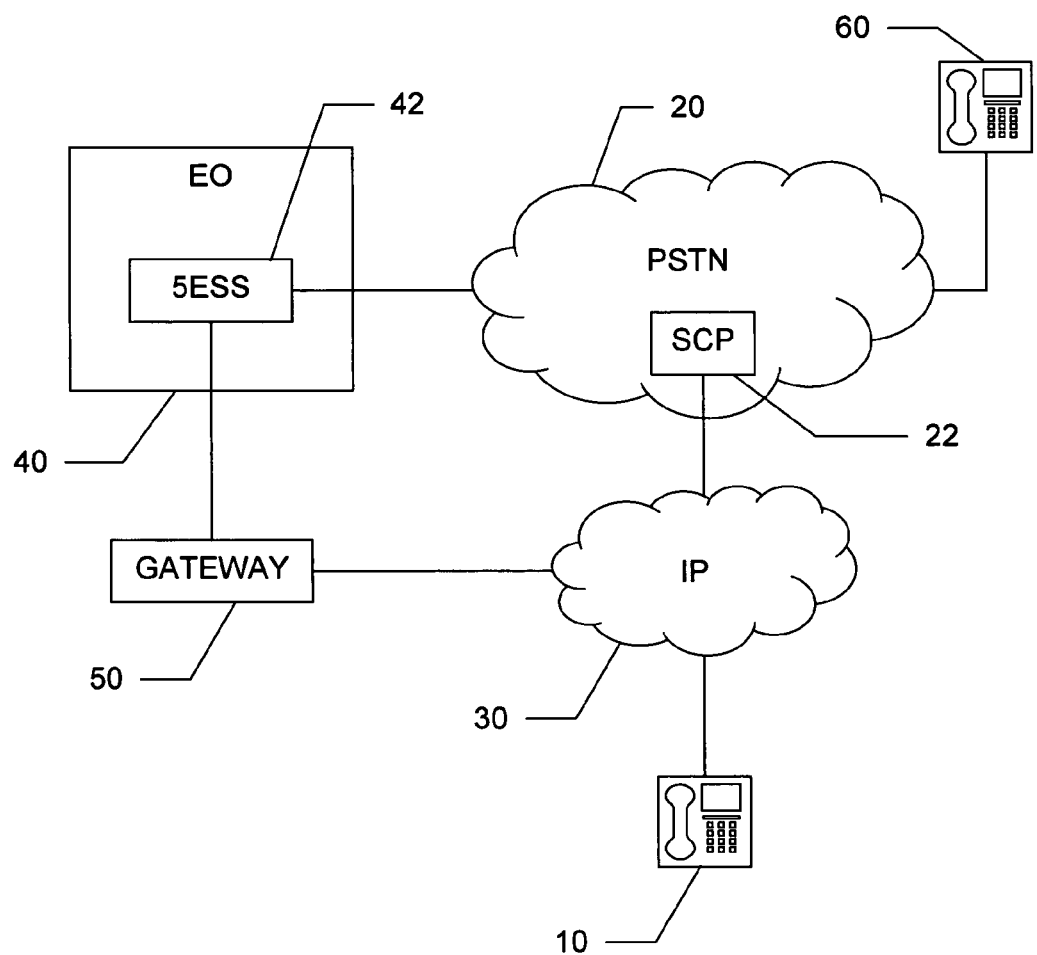
FIG. 1 is a block diagram illustrating an exemplary telecommunications network suitable for practicing aspects of the present inventive subject matter.

With reference to FIG. 1, a calling party uses consumer premises equipment (CPE) 10 to selectively place a telephone call over a PSTN 20. The calling CPE 10, as illustrated, is an IP telephone, suitably, a hardphone or a softphone running as an application on a general purpose computer or the like. However, the CPE 10 may be any traditional IP-based CPE, e.g., used to engage in Voice over IP (VoIP), facsimile, data or other like calls. In the usual manner, the CPE 10 operatively connects with an IP network 30, such as the Internet or another managed or unmanaged packet-switched network.

Suitably, the CPE 10 is served by an end office (EO) 40. The EO 40 includes a telecommunications switch 42 (e.g., a class 5 switch such as the Lucent Technologies 5ESS or another like switch) that is operatively connected to the PSTN 20 in the usual manner. An IP gateway 50 is operatively connected between the switch 42 and the IP network 30 thereby bridging the IP network 30 with the PSTN 20 in the usual manner. That is to say, the IP gateway 50 acts as a point of entry for packet-switched calls from the IP network 30 headed into the PSTN 20, and similarly acts as a point of entry for circuit-switched calls from the PSTN 20 headed into the IP network 30. In the usual manner, the IP gateway 50 selectively converts and/or translates packet-switched calls into circuit-switched calls and vice versa depending on the direction of traffic flow. For example, a suitable IP gateway is an iMerge® gateway provided by Lucent Technologies.

While for simplicity and clarity herein only one calling CPE 10, and one EO 42 and gateway 50 are illustrated in the present example, it is to be appreciated that a single EO suitably serves a plurality of similarly situated CPEs through one or more like IP gateways, and that a plurality of such EOs are similarly equipped and likewise arranged with respect to the PSTN 20.

Suitably, an agent or network element operating within the PSTN 20 supports one or more services or features for establishing a PSTN call via an IP request. To invoke this feature, the calling party uses the CPE 10 to send a signaling message through the IP network 30 into the core of the PSTN 20. The signaling message is optionally generated and/or send in response to the calling party keying-in an assigned feature code with the CPE 10 or otherwise entering an instruction or command to use the feature. In a suitable embodiment, the signaling message is a single message that includes one or more of: routing information (i.e., the identities of the calling CPE and/or the called CPE, e.g., with their respective telephone numbers), a priority level of the call, and authentication credentials or other information. Optionally, the authentication information may comprise a digital signature used to identify the calling party as an authorized user of the feature. Alternately, optionally the calling party's telephone number is used as the authentication information, in which case the telephone number is checked against a subscriber database (not shown) to determine if the calling party subscribes to the feature being invoked. Optionally, the signaling message may in fact take the form of a series of separate messages each conveying one or more of the foregoing details, e.g., in response to prompts therefor. For some applications, such as GETS, authentication is not performed at this point in the call and thus authentication information may not be included in the initial messages. The authentication information may be transmitted at a latter stage in the call initiation and may be carried with either in-band or out-of-band signaling.

Upon receipt of the signaling message by the aforementioned agent or network element (suitably, a Signaling System 7 (SS7) Signaling Control Point (SCP) 22 having a packet-network interface), the switch 42 is requested to set up a call between the calling CPE 10 and a called CPE, e.g., CPE 60 (if identified). When sufficient resources become available at the EO 40, the call is established. Suitably, the call is established using existing PSTN mechanisms, e.g., based on the PSTN Class Automatic Callback (AC) feature.

For example, the AC feature, as it is understood, is typically invoked by a calling party that receives a busy signal when calling a called party. After invoking the AC feature, the calling party simply hangs-up. However, the AC feature acts to request placement of a subsequent call to the called party when their line becomes idle. When the called party's line does indeed become idle, the calling party's line is rung or their CPE otherwise altered. When the calling party answers, a call is automatically established with the called party.

Likewise, when a service or feature for establishing a PSTN call via an IP request is invoked, the call is in essence originated from inside the PSTN 20 outward toward the CPE when the appropriate resources are available. In this manner, the call has bypassed having to wait in the normal manner for resources to become available to originate a call at the EO 40. Essentially, the call is afforded a higher priority than other line originating call attempts requiring dial tone and digit collection, e.g., waiting to receive dial tone. Accordingly, emergency or other important calls are established at a higher priority, equivalent to the priority of call completion of calls that have proceeded to their destination. Notably, the EO 40 treats the establishment of the call like a terminating call as opposed to an originating call. Once the call has been initiated however, the EO 40 recognizes the calling party as the originating party of the call.

Optionally, the priority provided may be further based upon the priority level information provided in the signaling message received by the SCP 22. For example, the highest priority emergency call initiated in this manner may, in principle, force the switch 42 to drop other calls if resources are otherwise too low to accommodate the emergency call. Other high priority but non-emergency calls may simply be moved to the front of the cue for the next resources to become available in the otherwise normal course of operation of the switch 42.

Note that suitably the CPE 10 is optionally provisioned and/or programmed with its own telephone number, id and/or other information from which its telephone number is discernable. Likewise, the CPE 10 is optionally provisioned and/or programmed with the authentication information and/or data. In either case, this information is optionally automatically captured and/or included with the signaling message invoking the service or feature for establishing a PSTN call via an IP request. Alternately, these details are optionally entered manually when invoking the feature, with or without a called telephone number. Note, when proper authentication credentials are not provided, suitably, access to and/or use of the feature is denied. Moreover, different authentication credentials may be issued and/or employed for different priority levels. In some applications the authentication credentials are not required until a latter stage in the call establishment and in these applications the absence of authentication information will not adversely affect call establishment from proceeding.

In one embodiment, e.g., nominally termed an enhanced automatic callback (EAC) feature, the signaling message sent to the SCP 22 includes the identity of the called party's CPE 60, e.g., by telephone number. Optionally, the call is not established until resources are detected as being available or are otherwise made available to complete the connection all the way across the PSTN 20 (e.g., it is determined that the EO 40 and any intervening switches have enough capacity to complete the call and that the line for the called CPE 60 is idle). For example, the calling party enters on the CPE 10 a feature code for the EAC feature. An IP message invoking the EAC feature is sent to the SCP 22. The SCP in turn notifies an EO (not shown) serving the called party's CPE 60 of the request to establish a call, optionally after performing the proper authentication based upon the authentication credentials included in the IP message. Suitably, a Transaction Capabilities Application Part (TCAP) message is send to the called party's EO. In response, if the called party's line is busy, the called party's EO responds with busy and waits until the called party's line becomes idle. When the called party's line does become idle, the called party's EO sends a TCAP message to the EO 40. The EO 40, in response, has the switch 42 apply an alerting signal to the line serving the CPE 10, which in turn causes the CPE 10 to alert or ring, suitably with a ring distinct to or otherwise indicative of the EAC feature being used. Suitably, if the CPE 10 is provisioned with caller ID it displays the telephone number of the called CPE 60. When the calling party answers the CPE 10, the called is established in the usual manner. In this way, enhanced automatic callback is achieved.

In another embodiment, e.g., nominally termed a priority dial tone (PDT) feature, the signaling message sent to the SCP 22 only includes the identity of the calling party's CPE 10. In which case, the call is initiated when sufficient resources are detected as being available or are otherwise made available at the EO 40. For example, the calling party enters on the CPE 10 a feature code for the PDT feature. An IP message invoking the PDT feature is sent to the SCP 22. The SCP in turn notifies the EO 40 (e.g., via a TCAP message) of the request for priority dial tone, optionally after performing the proper authentication based upon the authentication credentials included in the IP message. In response, the EO 40 has the switch 42 apply an alerting signal to the line serving the CPE 10, which in turn causes the CPE 10 to alert or ring. When the calling party answers the CPE 10, dial tone is provided such that a call may be placed to any then dialed telephone number. In this manner, priority dial tone is achieved.

Figure 2:
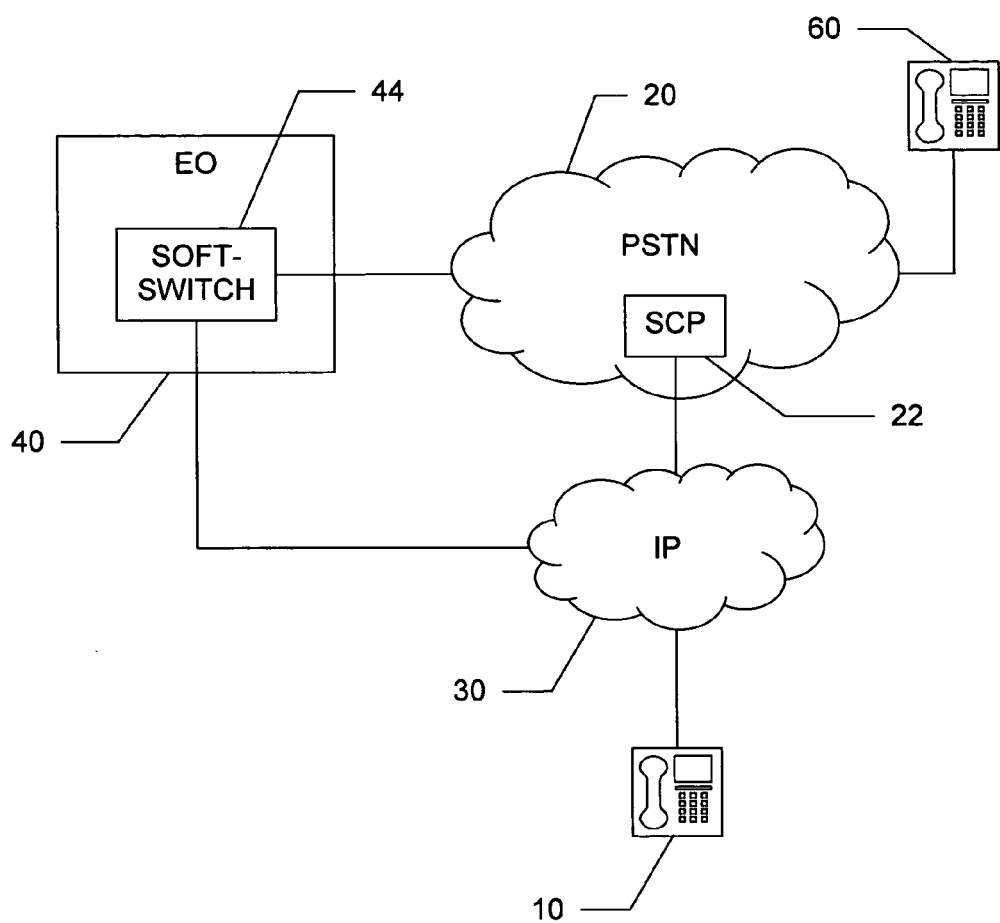
FIG. 2 is a block diagram illustrating another exemplary telecommunications network suitable for practicing aspects of the present inventive subject matter.

With reference to FIG. 2, the operation of the services or features for establishing a PSTN call via an IP request are essentially the same as otherwise described herein. However, the combination of the switch 42 and the gateway 50 is replaced by a softswitch 44 that acts as the functional equivalent of the combination.

Figure 3:
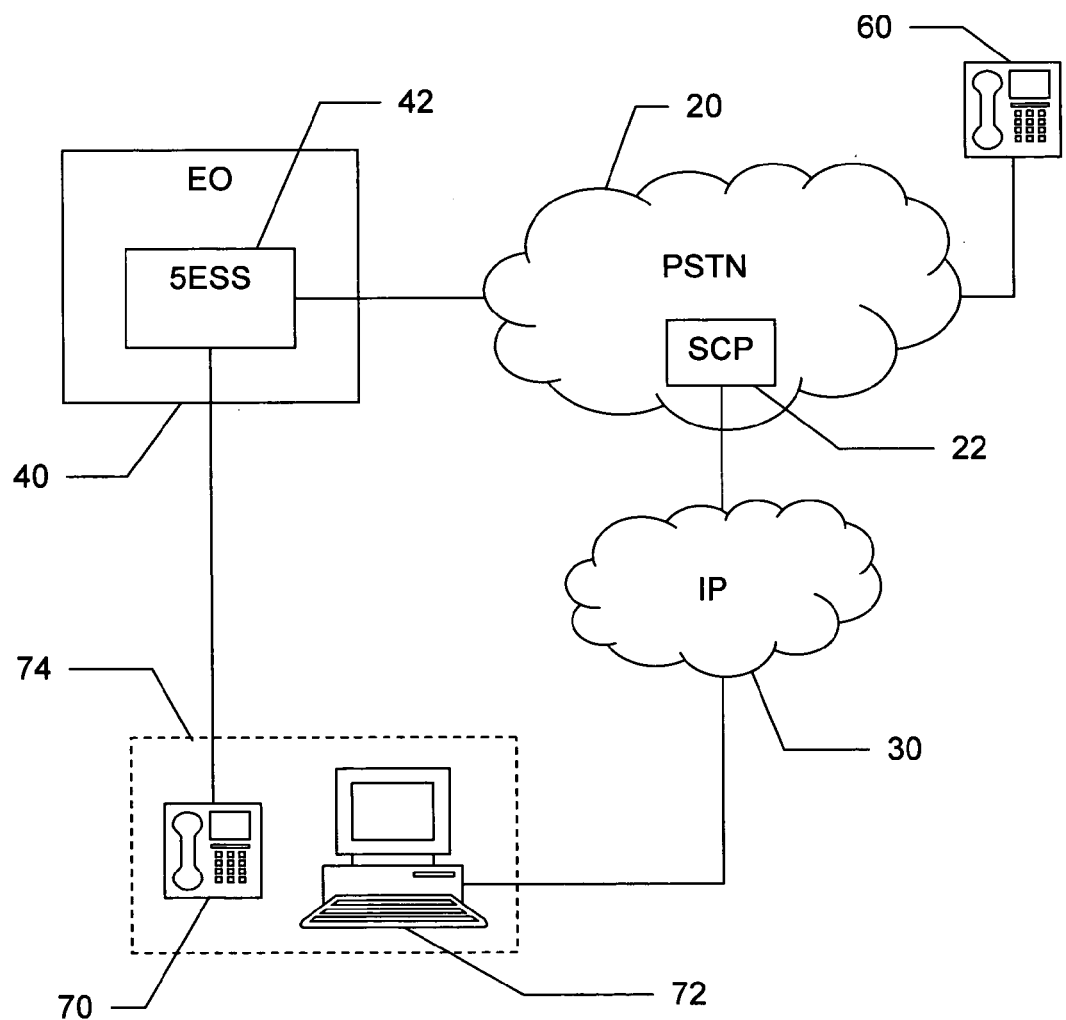
FIG. 3 is a block diagram illustrating yet another exemplary telecommunications network suitable for practicing aspects of the present inventive subject matter.

With reference to FIG. 3, the operation of the services or features for establishing a PSTN call via an IP request are again essentially the same as otherwise described herein. However, rather than a IP-based CPE 10, the calling party employs a separate circuit-switched CPE 70 and a computer 72 (e.g., a general purpose computer) that are optionally situated at a common location 74, e.g., on the desk or in the office of the calling party. As shown, the CPE 70 is operatively connected to the switch 42 in the usual manner so as to be served by the EO 40, and the computer 72 is operatively connected to the IP network 30 in the usual manner. Accordingly, the calling party uses the computer 72 to send the IP request to the SCP 22, and the signaling message sent identifies the CPE 70 as the calling CPE. The features or services otherwise operate in essentially the same way as described herein.

The computer 72 is optionally provisioned with the telephone number or other identifying information for the CPE 70 so that it is automatically captured when the feature invoking IP message is sent. Alternately, the information is manually entered upon invocation of the feature. Additionally, while a computer 72 is shown, it is to be appreciated that any like IP-connected device is optionally employed, e.g., an Internet enabled personal digital assistant (PDA), etc.

Yet another service or feature, nominally termed a scheduled calling (SC) feature, is provided for by supporting the establishment of a PSTN call via an IP request. The SC feature is particularly applicable to the embodiment shown in FIG. 3 and the embodiment of FIG. 1 where the CPE 10 is a softphone running as an application on a computer. In either case, the calling party has the option of using the SC feature to schedule in advance the placement of a call to one or more individuals. Optionally, the scheduled call is scheduled to be placed numerous times at periodically intervals. For example, consider an individual that hosts a weekly Friday morning conference call. The SC feature allows that call to be scheduled so that every Friday morning the call is automatically placed.

For example, once a call is scheduled using the SC feature, the CPE 10 or computer 72 automatically generates and sends the IP signaling message to the SCP 22 at the designated time. Suitably, the signaling message includes each of the called party's telephone numbers to be included in the call as well as the host's telephone number. The SCP in turn notifies the EO 40 (e.g., via a TCAP message) of the requested call, optionally after performing the proper authentication based upon the authentication credentials included in the IP message. In response, the EO 40 has the switch 42 apply an alerting signal to the line serving the CPE 10 or 70 as the case may be, which in turn causes the CPE to alert or ring. When the host answers the CPE, the calls to the called parties are established in the usual manner. Optionally, prior to ringing the host's CPE, the called parties' lines are first checked to see that they are idle in a similar fashion to the EAC feature.

Note again the SC feature is particularly applicable to the embodiments employing computers (i.e., the embodiment of FIG. 3 or the embodiment of FIGS. 1 and 2 where the CPE 10 is a softphone running as an application on a computer). In such cases, the calls are optionally scheduled by entering them in an electronic datebook or calendar maintained on the computer. For example, call scheduling is optionally tied to a commercially available electronic calendar such as the one found in Microsoft's Outlook®, or another like electronic calendar or datebook. The electronic calendar or datebook is then responsible for triggering when the IP signaling message invoking the SC feature is send to the SCP 22. Suitably, however, the SC feature is also applicable to the other disclosed embodiments. For example, where the CPE 10 is a hardphone, it is optionally provisioned with an electronic calendar or datebook that stores a schedule of calls to be made using the SC feature.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of establishing a call over a Public Switched Telephone Network (PSTN), comprising:
   receiving a message from a calling party at a network element of a PSTN requesting establishment of the call over the PSTN using a callback feature, the calling party associated with a calling party's consumer premises equipment (CPE) served by a first end office (EO) associated with the PSTN, said message being received via an internet protocol (IP) network and including identifying information for the calling party's CPE;
   notifying the first EO of the request for establishment of the call using the callback feature;
   determining at least one of trunk and switch resources are available for the call at the first EO;
   originating the call from the PSTN such that the first EO at least initially treats establishment of the call like a call terminating at the calling party's CPE as opposed to a call originating from the calling party's CPE;
   applying an alerting signal to the calling party's CPE; and
   establishing the call from the calling party's CPE to a called party's CPE after the calling party's CPE is answered in response to the alerting signal;
   wherein the call originated from the PSTN is given a higher priority than other line originating call attempts to the first EO that wait for a dial tone and require digit collection.

2. The method of claim 1, wherein the network element includes a Signaling System 7 (SS7) Signaling Control Point (SCP).

3. The method of claim 1, wherein the calling party's CPE includes an IP hardphone or an IP softphone operatively connected to the IP network.

4. The method of claim 1, wherein the callback feature includes a priority dial tone (PDT) feature and, after the calling party's CPE is answered in response to the alerting signal, the first EO provides a dial tone to the calling party's CPE such that the call may be placed to any telephone number then dialed from the calling party's CPE.

5. The method of claim 1, wherein the callback feature includes an enhanced automatic callback (EAC) feature and the message requesting establishment of the call also includes identifying information for the called party's CPE.

6. The method of claim 5, further including:
   notifying a second EO associated with the PSTN and serving the called party's CPE of the request for establishment of the call using the callback feature; and
   determining the called party's CPE is idle, wherein the alerting signal is applied to the calling party's CPE after the called party's CPE is determined to be idle.

7. The method of claim 6, further comprising:
   sending a Transaction Capabilities Application Part (TCAP) message to the second EO from the network element in conjunction with the notifying in claim 10.

8. The method of claim 6, further comprising:
   sending a callback message from the second EO to the first EO regarding the call indicating the calling party's CPE is idle, wherein the alerting signal is applied to the calling party's CPE after the callback message is received at the first EO.

9. The method of claim 8, further comprising:
   sending a Transaction Capabilities Application Part (TCAP) message to the first EO from the second EO in conjunction with the sending in claim 8.

10. The method of claim 8, further comprising:
    determining intervening switches between the first EO and the called party's CPE have enough capacity to complete the call, wherein the alerting signal is applied to the calling party's CPE after the intervening switches are determined to have enough capacity; and
    making at least one of trunk and switch resources available across the PSTN from the first EO to the called party's CPE for completion of the call prior to establishing the call.

11. The method of claim 1, wherein the message requesting establishment of the call is sent from a computer operatively connected to the IP network and associated with the calling party, said calling party's CPE being a circuit-switched device separate from the computer.

12. The method of claim 11, wherein the identifying information for the calling party's CPE is provisioned in the computer and automatically captured when the message requesting establishment of the call is sent.

13. The method of claim 11, wherein the identifying information for the calling party's CPE is manually entered and included in the message requesting establishment of the call via the computer.

14. The method of claim 1, wherein the callback feature includes a scheduled calling (SC) feature and said message requesting establishment of the call is scheduled in advance to be sent to the network element at a designated time.

15. A system for establishing a call over a Public Switched Telephone Network (PSTN), comprising:
    a first end office EO associated with the PSTN and serving a calling party's consumer premises equipment (CPE); and
    a network element within the PSTN configured to receive a message from a calling party requesting establishment of the call over the PSTN using a callback feature, the calling party associated with the calling party's CPE, said message being received via an Internet protocol (IP) network and including identifying information for the calling party's CPE;
    wherein the network element is configured to notify the first EO of the request for establishment of the call using the callback feature;
    wherein the network element, in cooperation with the first EO, is configured to determine at least one of trunk and switch resources are available for the call at the first EO;
    wherein the network element is configured to originate the call from the PSTN such that the first EO at least initially treats establishment of the call like a call terminating at the calling party's CPE as opposed to a call originating at the calling party's CPE;
    wherein the first EO is configured to apply an alerting signal to the calling party's CPE;
    wherein the network element and first EO are configured to establish the call from the calling party's CPE to a called party's CPE after the calling party's CPE is answered in response to the alerting signal;
    wherein the call originated from the network element is given a higher priority than other line originating call attempts to the first EO that wait for a dial tone and require digit collection.

16. The system of claim 15, wherein the network element includes a Signaling System 7 (SS7) Signaling Control Point (SCP).

17. The system of claim 15, wherein the calling party's CPE includes an IP hardphone or an IP softphone operatively connected to the IP network.

18. The system of claim 17, wherein the first EO includes a class 5 telecommunications switch operatively bridged to the IP network via an IP gateway.

19. The system of claim 17, wherein the first EO includes a softswitch operatively connected to the IP network.

20. The system of claim 15 wherein the callback feature includes an enhanced automatic callback (EAC) feature and the message requesting establishment of the call also includes identifying information for the called party's CPE, the system further comprising:
   a second EO associated with the PSTN and serving the called party's CPE:
   wherein the network element is configured to notify the second EO of the request for establishment of the call using the callback feature;
   wherein the network element, in cooperation with the second EO, is configured to determine the called party's CPE is idle;
   wherein the second EO is configured to send a callback message to the first EO regarding the call indicating the calling party's CPE is idle;
   wherein the network element and second EO are configured to determine intervening switches between the first EO and the called party's CPE have enough capacity to complete the call, wherein the alerting signal is applied by the first EO after the intervening switches are determined to have enough capacity; and
   wherein the network element and second EO are configured to make at least one of trunk and switch resources available across the PSTN from the first EO to the called party's CPE for completion of the call prior to the call being established by the network element and first and second EOs.

21. The system of claim 15 wherein the callback feature includes a priority dial tone (PDT) feature;
   wherein the first EO is configured to provide a dial tone to the calling party's CPE after the calling party's CPE is answered in response to the alerting signal and prior to the call being established such that the call may be placed to any telephone number then dialed from the calling party's CPE.

22. The system of claim 15 wherein the callback feature includes a scheduled calling (SC) feature;
   wherein the calling party's CPE is configured to permit the calling party to schedule the sending of the message requesting establishment of the call to the network element for a designated time.

23. A method of establishing a call over a Public Switched Telephone Network (PSTN), the method comprising:
   at a network element of the PSTN, receiving a message from a calling party via an internet protocol (IP) network requesting establishment of the call over the PSTN using an enhanced automatic callback (EAC) feature, the calling party associated with a calling party's consumer premises equipment (CPE) served by a first end office (EO) associated with the PSTN, said call between the calling party's CPE and a called party's CPE, the called party's CPE served by a second EO associated with the PSTN, at least the called party's CPE including a circuit-switched device, said message including identifying information for the calling party's CPE and the called party's CPE;
   at the network element of the PSTN, sending a Transaction Capabilities Application Part (TCAP) message to the second EO to provide notice of the request for establishment of the call using the EAC feature;
   determining the called party's CPE is idle;
   at the second EO, sending a TCAP message to the first EO regarding the call indicating the called party's CPE is idle;
   determining at least one of trunk and switch resources are available for the call at the first EO;
   determining intervening switches between the first EO and the called party's CPE have enough capacity to complete the call;
   originating the call from the PSTN such that the first EO at least initially treats establishment of the call like a call terminating at the calling party's CPE as opposed to a call originating from the calling party's CPE;
   at the first EO, applying an alerting signal to the calling party's CPE;
   making at least one of trunk and switch resources available across the PSTN from the first EO to the called party's CPE for completion of the call; and
   establishing the call from the calling party's CPE to the called party's CPE after the calling party's CPE is answered in response to the alerting signal using the at least one of trunk and switch resources made available across the PSTN;
   wherein the call originated from the PSTN is given a higher priority than other line originating call attempts to the first EO that wait for a dial tone and require digit collection.

* * * * *